Dec. 5, 1967     R. G. COLCLASER, JR., ET AL     3,356,809
MULTI-BREAK COMPRESSED-GAS CIRCUIT INTERRUPTERS WITH
ROTATING GAS-CONDUCTING BRIDGING MEMBERS
Filed June 2, 1964                                6 Sheets-Sheet 1

INVENTORS
Robert G. Colclaser, Jr. &
Frank L. Reese.
BY
Willard R. Crout
ATTORNEY

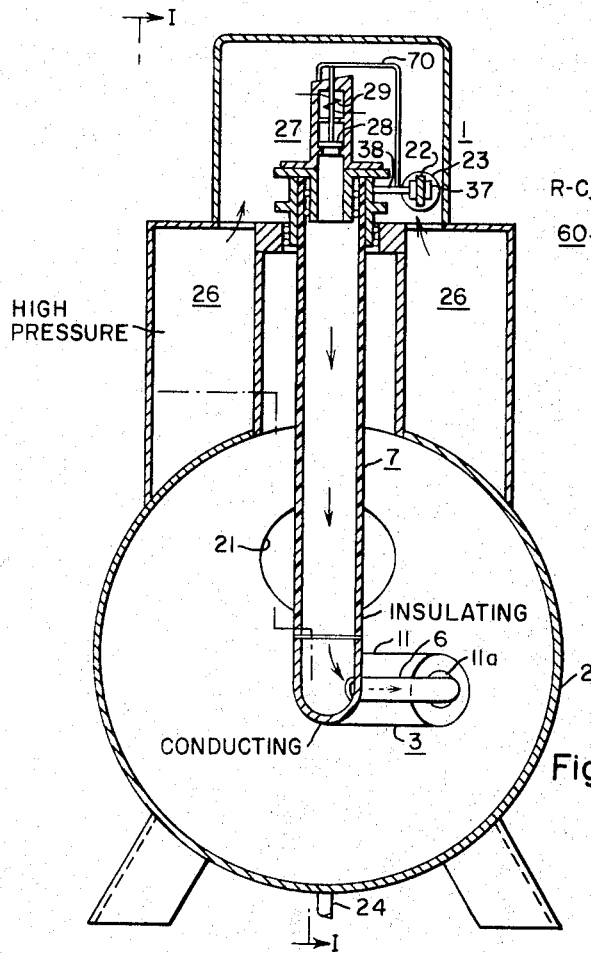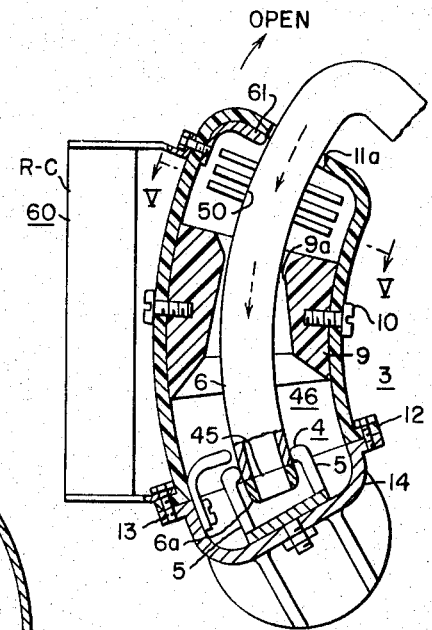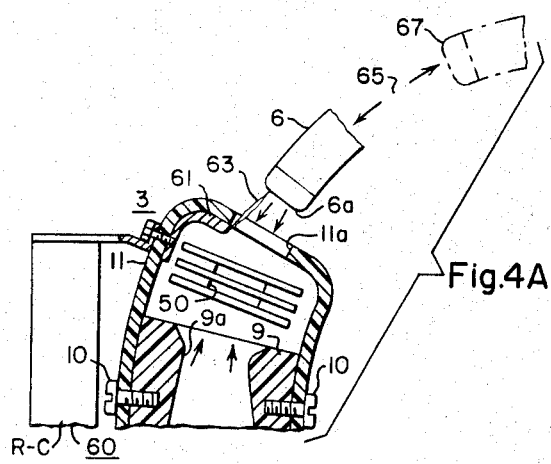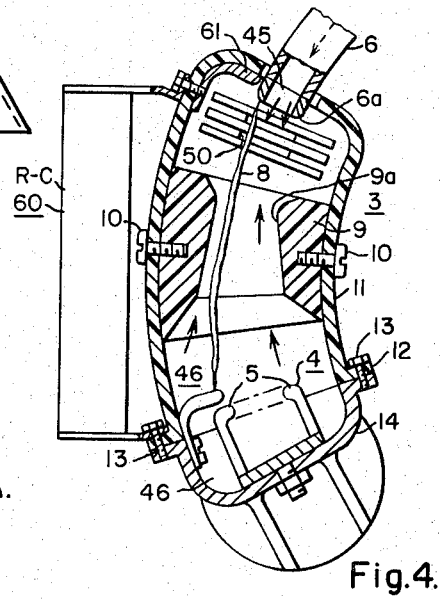

United States Patent Office 3,356,809
Patented Dec. 5, 1967

3,356,809
MULTI-BREAK COMPRESSED-GAS CIRCUIT INTERRUPTERS WITH ROTATING GAS-CONDUCTING BRIDGING MEMBERS
Robert G. Colclaser, Jr., Franklin Township, Delmont, and Frank L. Reese, Wilkinsburg, Pa., assignors to Westinghouse Electric Corporation, East Pittsburgh, Pa., a corporation of Pennsylvania
Filed June 8, 1964, Ser. No. 373,150
11 Claims. (Cl. 200—148)

ABSTRACT OF THE DISCLOSURE

A compressed-gas circuit breaker has a fluid-conducting rotatable operating rod carrying two outwardly extending tubular movable contacts therewith. These two movable tubular contacts enter confined arc-extinguishing units and transmit gas flow thereinto to be stored and subsequently discharged for arc-extinguishing flow at the two established arcs drawn within the two confined arc-extinguishing units.

---

This invention relates generally to compressed-gas circuit interrupters and, more particularly, to compressed-gas circuit interrupters of the type in which the arc is extinguished by a controlled blast of gas issuing from a source of high pressure.

A general object of the present invention is to provide an improved, compact compressed-gas circuit interrupter of highly efficient and dependable operation and adaptable for use as a "building block" or as a modular unit over a wide voltage range.

A more specific object of the present invention is the provision of an improved compressed-gas circuit interrupter of the dead-tank type, that is, in which the enclosing metal casing is grounded, and in which the movable contact arms are rotated by a hub assembly, which is disposed substantially centrally of the casing structure.

Still a further object of the present invention is the provision of an improved dead-tank type of compressed-gas circuit interrupter of minimum dimensions, and in which the controlled flow of high-pressure gas passes through a rotating hub assembly, which also carries the serially-related movable contact arms.

Still a further object of the present invention is the provision of an improved compressed-gas circuit interrupter of the type specified in the immediately preceding paragraph, in which the flow of gas passes outwardly through the two rotating movable contact arms and is directed into cooperating arc-extinguishing structures.

Still a further object of the present invention is the provision of an improved compressed-gas circuit interrupter in which blast-valve operation is mechanically achieved regardless of failure of the electrical circuit, which normally controls blast-valve operation.

Still a further object of the present invention is the provision of an improved compressed-gas circuit interrupter in which the voltage and duty rating may be raised by the utilization of shunting resistors and the gas blast may be used for not only effecting main current interruption but also for effecting the residual-current interruption.

Another object of the invention is the provision of an improved compressed-gas circuit interrupter in which improved voltage control may be achieved by a combination of resistors and capacitors, and residual-current interruption may be effected by a blast of compressed gas.

Yet a further object of the present invention is the provision of an improved compressed-gas circuit interrupter in which high-speed contact separation is achieved by a rotating movable contact structure, and in which the gas blast is highly effectively directed at the arc by being forced through the tubular movable rotating contacts themselves.

Still a further object of the present invention is the provision of an improved arc-extinguishing unit having a movable tubular contact associated therewith, through which a controlled blast of compressed-gas issues.

Another object of the present invention is the provision of an improved arc-extinguishing unit involving a serially-related pair of interrupting sections, one of which comprises an orifice member, and the other section comprising an enclosed chamber having at least one lateral vent. Preferably, the lateral vent contains splitter members disposed within the vent openings for facilitating arc interruption.

Still a further object of the present invention is the provision of an improved compressed-gas circuit interrupter of the tank type in which a conduit-rotating hub assembly carries a pair of serially-related movable tubular contact arms, and the blast-valve assembly is disposed adjacent the lower end of such assembly, in immediate proximity to the associated arc-extinguishing units.

Yet a further object of the present invention is the provision of an improved high-power compressed-gas circuit interrupter of the dead-tank type in which a rotating hub assembly carries four tubular moving contacts; and two pairs of resistance and main-current interrupting units are associated with each pair of rotating moving tubular contacts.

A further object of the present invention is the provision of an improved high-voltage compressed-gas circuit interrupter adaptable for ready assembly and operable with a minimum of maintenance, and in which the several parts are so constructed and arranged as to facilitate removal thereof, and permit a ready inspection of the contact structure.

Additional objects and advantages will readily become apparent upon reading the following specification, taken in conjunction with the drawings, in which:

FIG. 2 is a vertical sectional view taken through the tank structure of FIG. 1 substantially along the line II—II of FIG. 1;

FIG. 3 is a horizontal plan sectional view taken through one of the two arc-extinguishing units of the circuit interrupter of FIG. 1, the contact structure being shown in the closed-circuit position;

FIG. 4 is a view similar to that of FIG. 3 but illustrating the arc-lengthening process during circuit interruption;

FIG. 4A is a view similar to FIG. 4, but illustrating the interrupting effect exerted upon the residual current arc drawn during an opening operation;

Figure 1:
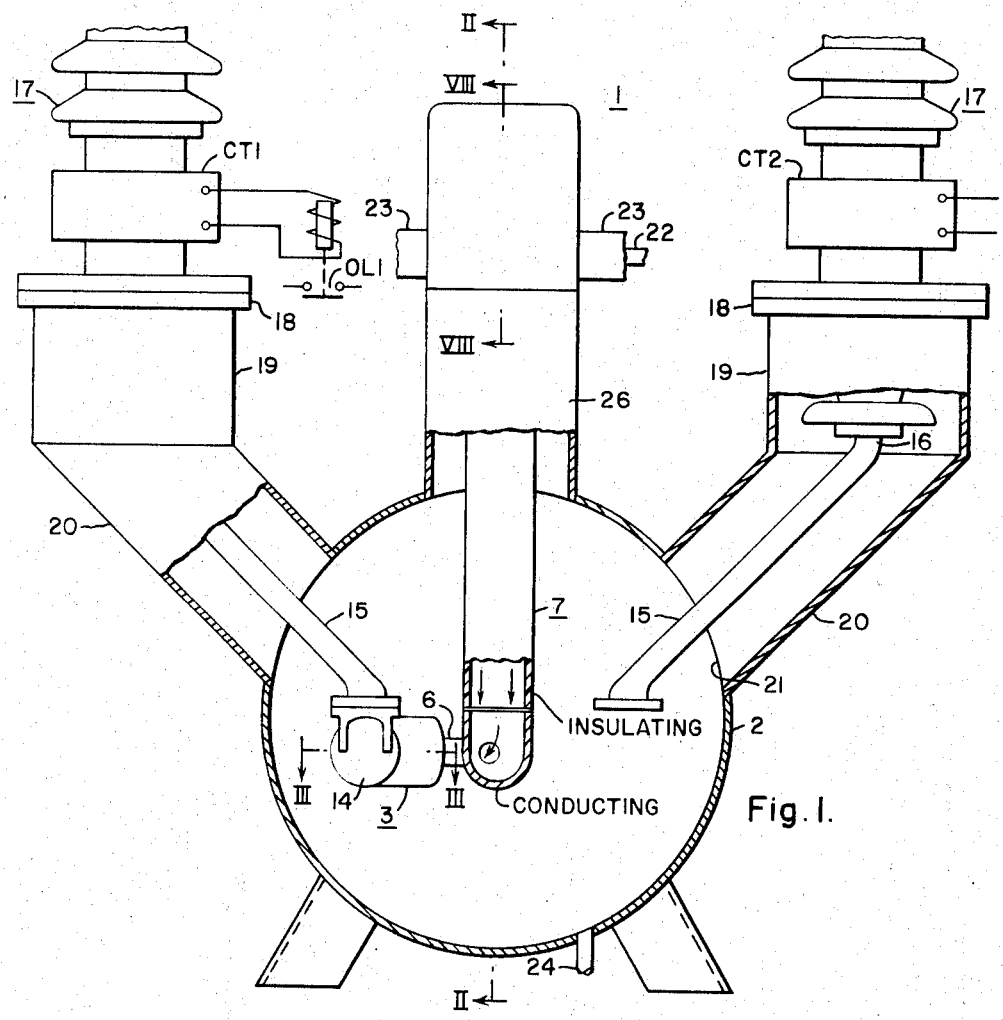
FIGURE 1 is a vertical sectional view taken through a compressed-gas circuit interrupter embodying features of the present invention, the view being taken substantially on the line I—I of FIG. 2, with the contact structure being shown in the closed-circuit position.

Referring to the drawings, and more particularly to FIG. 1 thereof, the reference numeral 1 generally designates a compressed-gas circuit interrupter. As will be obvious to those skilled in the art, for the interruption of a three-phase circuit, there will be employed three of the tank structures 2 illustrated in FIG. 1, each tank structure 2 constituting a pole-unit A, B or C, and each pole-unit having associated therewith a pair of serially-related arc extinguishing units, generally designated by the reference numeral 3.

The two serially-related arc-extinguishing units 3 may be of the orifice type, as more clearly shown in FIGS. 4 and 4A of the drawings. As more clearly shown in FIG. 4, a relatively stationary contact structure 4, comprising circumferentially-disposed contact fingers 5, cooperates with a tubular rotating movable contact 6. As shown in FIGS. 1 and 2, there are two tubular movable rotating contacts 6 carried by the lower free end of a rotatable hub assembly, generally designated by the reference numeral 7, and more clearly illustrated in FIGS. 2 and 8 of the drawings.

Figure 9:
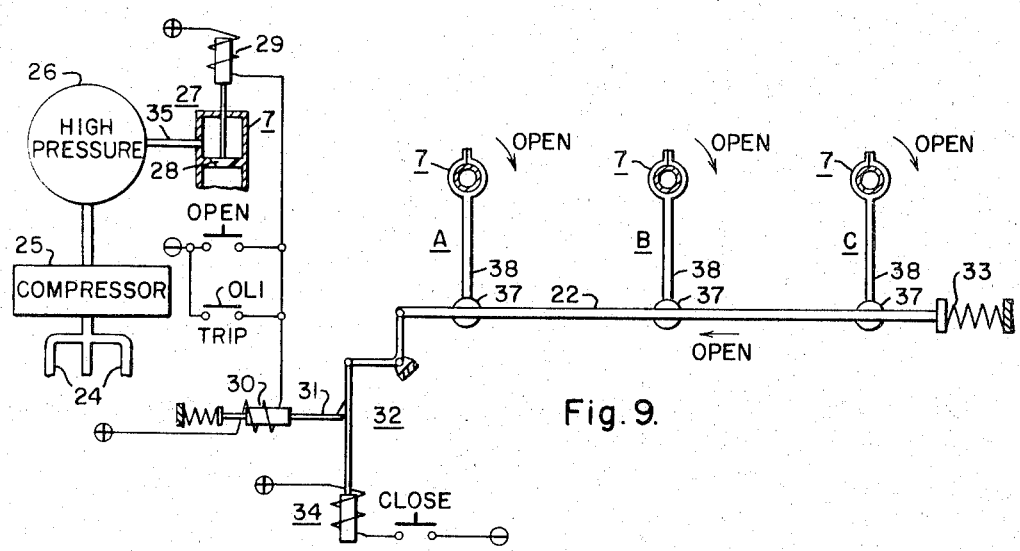
FIG. 9 is a somewhat diagrammatic view of the operating mechanism for a three-pole circuit interrupter of the type shown in FIGS. 1 and 2.

Generally, the contact-operating arrangement is such that during a circuit-opening movement, the hub assembly 7 rotates in a clockwise direction, as viewed in FIGS. 4 and 9, to effect thereby separation of the tubular movable contact 6 away from the stationary contact structure 4 to draw an arc 8 through an insulating orifice structure 9. FIG. 4 of the drawings shows this action more clearly. As shown in FIG. 4, the insulating orifice structure 9 may be secured by suitable fastening means, such as bolts 10, to a substantially enclosed insulating casing or housing 11 having a supporting flange portion 12, which may be removably secured by bolts 13 to an adaptor foot 14. The adaptor foot 14 is formed of a suitable conducting material, and is threadedly secured and clamped, for example, to a conductor lead 15, which is connected to the terminal stud 16 extending axially through a terminal bushing 17 of the interrupter 1.

With reference to FIG. 1, it will be noted that the vertically-extending terminal bushings 17 are supported upon flange seats 18, welded to the upper end of support collars 19. The support collars 19 are fixedly secured, as by welding, to inclined tubular supports 20, the latter, in turn, being welded circumferentially about openings 21 provided in the upper side walls of the tank structure 2.

It will be apparent to those skilled in the art that, generally, the electrical circuit, passing through the circuit interrupter 1, comprises the two terminal bushings 17, the lead conductors 15, the adaptors 14, relatively stationary contacts 4, and in a serial manner through the movable tubular rotating contacts 6, which are rotated by the actuating hub assembly 7. The two arcs 8 are drawn in serial relation, and extinction of one of these arcs 8 will necessarily interrupt the connected circuit.

As mentioned hereinbefore, preferably a three-phase circuit interrupter 1 comprises the three individual tanks 2, which have the rotating hub assemblies 7 mechanically interconnected for simultaneous movement by a generally horizontally-extending operating rod 22 (FIGS. 2 and 9), which passes longitudinally through an enclosing tube 23 interconnecting the high-pressure reservoir tanks 26. When the compressed gas, which is utilized, comprises a relatively expensive gas, such as sulfur-hexafluoride ($SF_6$) gas, it is desirable to have a closed gas system and to use a compressor unit, hereinafter described. The interconnecting enclosing tubes 23 (FIG. 1) are utilized for high-pressure intercommunication between the reservoir tanks 26. The exhausted sulfur-hexafluoride gas from the units may be extracted from the general interior of the tanks 2 through pipes 24 and recompressed by a suitable compressor 25. The extracted gas may be compressed by such compressor means 25 to the requisite high-pressure level, wherein it is stored within the high-pressure storage tanks 26 (FIG. 2).

Figure 8:
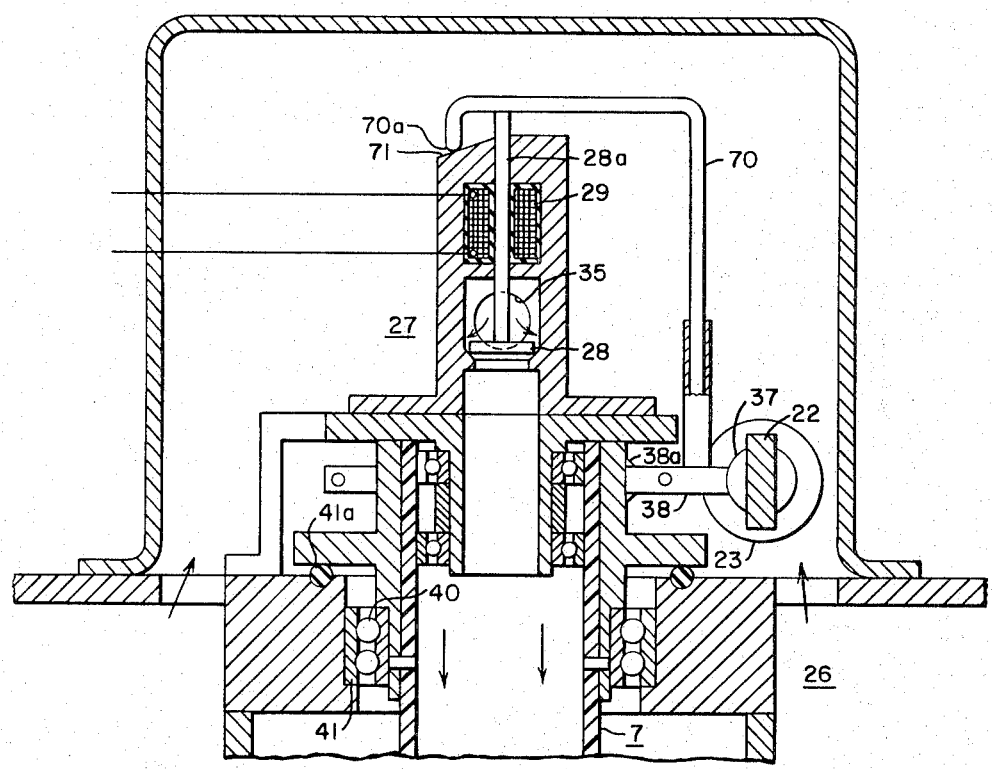
FIG. 8 is an enlarged vertical sectional view taken substantially along the line VIII—VIII of FIG. 1.

The flow of gas out of the high-pressure storage tank 26 is preferably effected by the operation of an electrically-actuated blast-valve assembly, generally designated by the reference numeral 27, and comprising a movable blast valve 28 more clearly shown in FIG. 8 of the drawings. The blast valve 28 is preferably mechanically actuated regardless of a failure of the electromagnetic tripping means 29 therefor. In other words, should a fault current flow through the circuit interrupter 1, a current transformer CT1 (FIG. 1) will sense this and suitable protective relaying means OL1 will be provided to sense such a fault condition and to become energized. The overload relay OL1 will energize the trip coil 30 (FIG. 9) and consequently release a latching means 31 constituting a part of the mechanical operating mechanism 32 (FIG. 9). Such a mechanical operating mechanism 32, may involve an accelerating compression spring 33, which functions during the opening operation to effect longitudinal horizontal opening movement of the connecting operating shaft 22.

During a closing operation, a suitable compressed-gas pneumatic mechanism may be provided; or a solenoid mechanism 34, as actually illustrated in FIG. 9, may be provided to effect closing movement of the interconnecting operating rod 22 against the compression spring force 33 and consequently effect recharging of such accelerating springs 33, the latter providing the power necessary during a subsequent opening operation.

For the purpose of understanding the present invention, however, it is only necessary to know that the energization of the trip coil 30 to unlatch the operating mechanism 32 will also be effective to energize the solenoid coil 29, associated with the blast valve 28, and to effect opening movement thereof to enable a flow of compressed-gas from the inlet opening 35 (FIG. 8) past the blast valve 28 and downwardly through the tubular vertically-extending combined operating rod and blast-tube assembly 7. As mentioned hereinbefore, the operating rod assembly 7 is rotated, and, to effect this end, the connecting rod 22 has a connection 37 with a crank arm 38, the latter being fixedly secured, as by welding 38a, to the rotatable operating shaft assembly 7.

As shown in FIG. 8 of the drawings, preferably suitable bearings 40, 41 are provided to enable a frictionless rotating movement of the operating rod assembly 7 and consequently, a rotative opening and closing movement of the pair of tubular movable contacts 6. In addition, gas sealing rings 41a may be provided.

It will furthermore be noted that the operation of the blast valve 28 may be obtained either electromagnetically, in simultaneous response with the tripping coil 30, or mechanically, as hereinafter more fully explained, to result in a flow of high-pressure gas from the high-pressure reservoir 26 downwardly through the rotatable blast tube 7, and then radially outwardly through the interior 45 of the two movable rotatable contacts 6. Such ejection of high-pressure gas through the ends of the movable contacts 6 will cause a raising of the pressure within the region 46 interiorly of the casing structure 11 on the high-pressure side of the orifice member 9. Because of the presence of the tubular movable contacts 6 within the orifice opening 9a of the orifice member 9, the pressure will rapidly build up within the region 46, and by the time that the tip end 6a of the movable tubular contact 6 has moved sufficiently to clear the orifice opening 9a, the compressed gas will be released from the space 46, and will flow out through the orifice opening 9a to effect extinction of the established arc 8, as shown more clearly in FIG. 4A.

Figure 5:
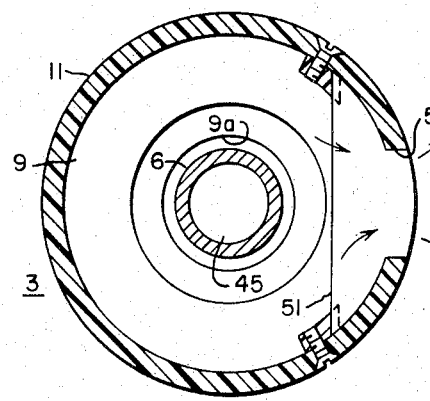
FIG. 5 is a sectional view taken through the arc-extinguishing unit of FIG. 3 substantially along the line V—V thereof.
Figure 6:
FIG. 6 is a detailed view of one of several spaced insulating arc splitters, which are inserted through a vent opening of the casing for the arc-extinguishing unit of FIGS. 4 and 5.
Figure 7:
FIG. 7 is a side elevational view of one of the arc-splitter elements.

In other words, the established arc 8, drawn between the movable tubular contact 6 and the stationary contact 4, will be drawn axially through the orifice opening 9a and will be subjected to an axial flow of gas ejected out of the region 46 and through a lateral vent port 50, which, in turn, is provided with a plurality of splitter plates 51 fitted thereinto, as shown in FIG. 5. Should the established arc 8 not be extinguished by the time that the tip 6a of the movable contact 6 has cleared the orifice opening 9a, the gas blast forced out of the orifice opening 9a will cause the arc 8 to be laterally moved against the splitter plates 51 as the compressed-gas vents out of the lateral vent opening 50. Voltage division between breaks can be obtained by inserting a high-ohmic resistor-capacitor assembly 60.

To facilitate the interrupting of the main current, and to effect a desired voltage control between the units 3, preferably a resistor-capacitor shunting impedance assembly 60 is provided, which has one end thereof electrically connected to the contact foot 14 and the other end to contact finger probe 61, which may bear laterally against the side of the movable tubular contact 6. As a result, the main-current arc 8, drawn between the contacts 4, 6 will be quickly extinguished, and the residual-current arc 63, which carries the residual current passing through the resistor-capacitor assembly 60, will be extinguished by the gas-blast issuing out of the orifice opening 11a at the free extremity of the casing 11, as shown in FIG. 4A.

As well known by those skilled in the art, the residual-current arc 63 will have an improved power factor, and will be of relatively low-current magnitude; hence, the interruption of such a residual current arc 63 is easily effected.

The continued rotative opening movement of the hub assembly 7 and the tubular rotatable movable contacts 6 will effect an isolating break 65 in free space interiorly of the tank structure 2, with no insulating surfaces shunting the isolating gap. It is desirable to have open isolating gap distance to effectively hold the high voltage in the open-circuit position of the circuit interrupter 1. The fully open-circuit position of the contact structure is indicated by the dotted lines 67 in FIG. 4A.

During the closing operation, as noted hereinbefore, a suitable solenoid mechanism is operative to effect closing movement of the operating rod 22 (FIG. 9) and charging of the accelerating spring 33 associated therewith. In the fully closed-circuit position of the circuit interrupter 1, the operating mechanism 32 is latched, and the accelerating spring 33 is in its charged state ready for effecting a subsequent opening operation of the interrupter.

Should the electromagnetic coil 29 associated with the blast valve 28 for some reason fail to operate, it is desirable to effect a positive mechanical opening movement of the blast valve 28 in response to opening rotative movement of the operating rod assembly 7. This important and desirable feature is provided in the instant invention by the provision of a rotative arm 70, which moves with the crankarm 38, and has a free end 70a which rides upon an inclined cam surface 71 to thereby cam the blast-valve stem 28a to an open position during the opening operation. By such means, should the electromagnetic coil 29 be rendered inoperative for any reason, mechanical opening of the blast valve 28 is assured in response to the mechanical opening rotative movement of the operating rod assembly 7.

Figure 10:
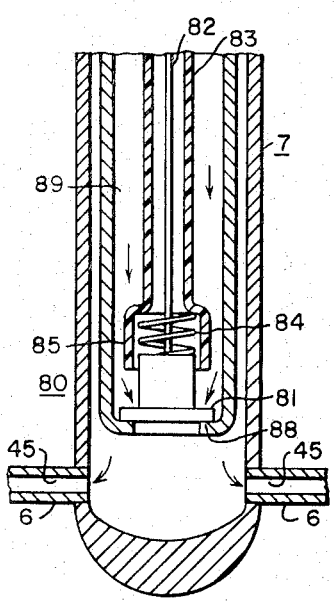
FIG. 10 is a fragmentary vertical sectional view taken through a modified-type of blast-valve assembly, which could be substituted for the blast-valve assembly of FIGS. 2 and 8.

FIG. 10 illustrates a modified type of blast-valve assembly 80, disposed generally lower down in the hub assembly 7 than was the case with the blast valve assembly illustrated in FIG. 2 of the drawings. With reference to the modified type of blast-valve assembly 80, it will be noted that there is provided a blast valve 81 mechanically operated by a blast-valve stem 82, which preferably extends upwardly through a guide tube 83. A compression spring 84 is disposed in the lower cup-shaped portion 85 of the guide tube 83 and biases the blast valve 81 downwardly against its seat 88. The blast-valve operating rod 82 may be actuated by a suitable solenoid, not shown, which may have the coil thereof energized simultaneously with the tripping coil 30 of the circuit interrupter 1. As before, the high-pressure gas disposed within the region 89 may pass downwardly past the blast-valve 81 and radially outwardly through the tubular movable conductor tubes 6.

Figure 11:
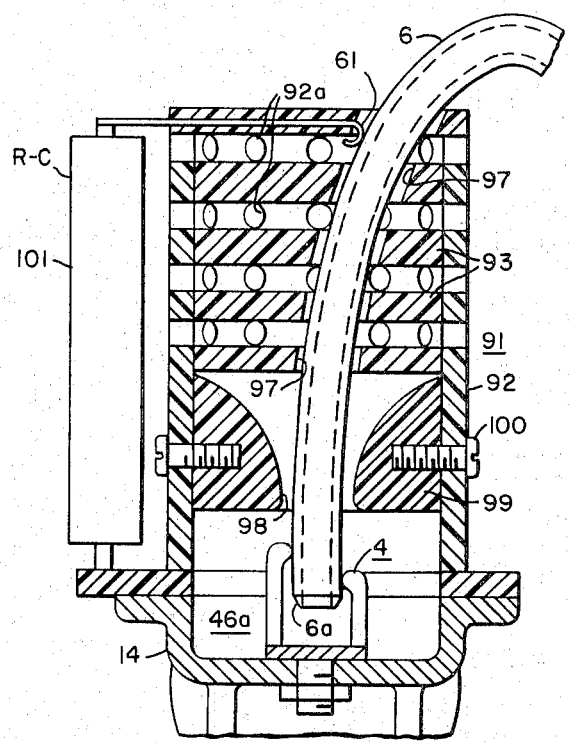
FIG. 11 is a vertical sectional view taken through a modified-type of arc-extinguishing unit, which could be substituted for the arc-extinguishing unit of FIG. 4, again the contact structure being shown in the closed-circuit position.
Figure 12:
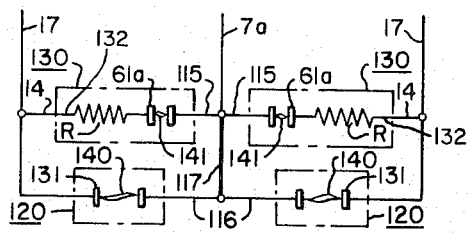
FIG. 12 is a diagrammatic view of a modified-type of circuit-interrupting structure utilizing an impedance section, which is inserted into series circuit during the opening operation.
Figure 14:
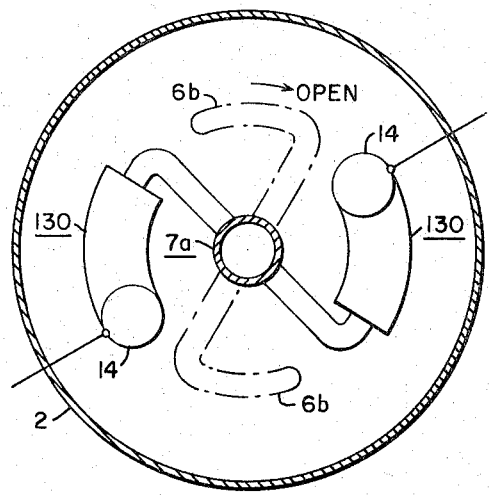
FIG. 14 is a somewhat diagrammatic view and illustrates a sectional view taken through the tank structure of FIG. 13, substantially along the line XIV—XIV of FIG. 13.
Figure 13:
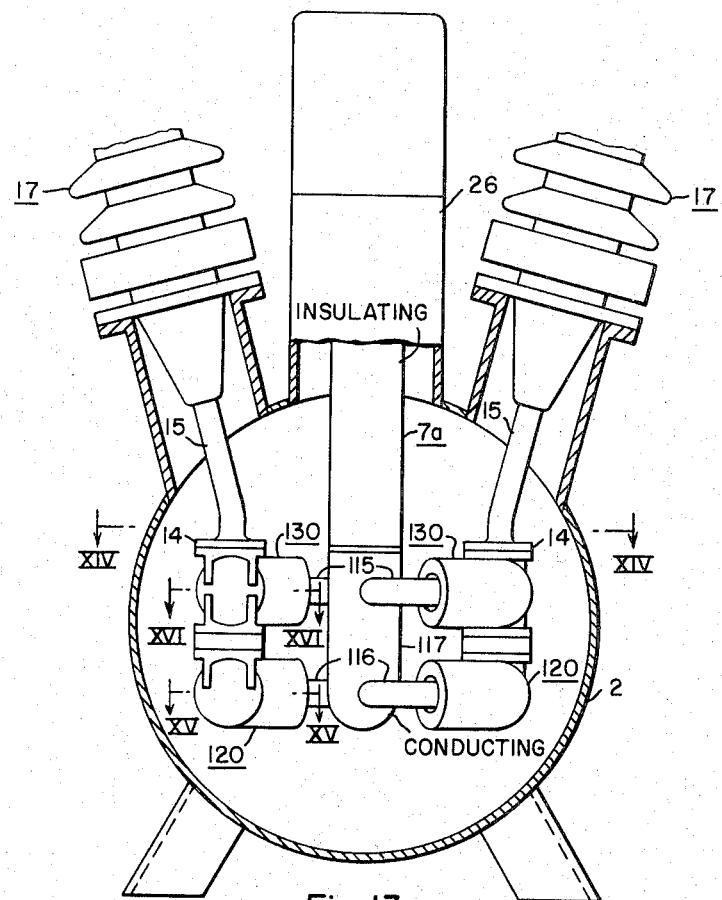
FIG. 13 is a somewhat diagramamtic view of a modified-type of circuit-interrupting structure utilizing the principles illustrated in the diagrammatic view of FIG. 12.

FIG. 11 shows a modified type of interrupting unit 91, which comprises an insulating casing 92 having disposed therein a plurality of spaced apertured insulating splitter plates 93. As shown, the movable rotative contact 6 will be separated from the relatively stationary contact 4 to draw an arc through the apertures 97 provided by the several splitter plates 93. Venting holes 92a are provided in the side walls of the casing 92 to facilitate ready venting between the plates 93.

Again the pressure is raised within the region 46a interiorly of the casing structure 92, and the pressure will be relieved through the orifice opening 98 provided by the orifice member 99. As before, the orifice member 99 is secured by suitable fastening means 100 to the casing 92. A laterally-disposed shunting impedance assembly 101 is provided, which is again electrically connected between the contact foot 14 and a finger probe 61, which bears upon the side of the rotative movable tubular contact 6.

During the opening operation, as will be apparent, the established arc will be drawn longitudinally through the several openings 97, and will be subjected to an axial flow of high-pressure gas passing through the tubular movable contact 6. The main-current arc will quickly be interrupted, and the residual-current arc will also be effectively extinguished, as drawn between the probe 61 and the tip 6a of the movable tubular contact 6.

As an aid to interruption at extremely high rates-of-rise of recovery voltage, relatively low-ohmic resistors may be effectively and easily inserted into the circuit, as illustrated in FIGS. 12–16 of the drawings. More particularly, with reference to FIG. 12, it will be noted that there is shown diagrammatically a possible type of circuit-interrupting arrangement involving a rotatable combined operating-rod and blast-tube assembly 7a carrying therewith two pairs of rotatable tubular contacts 115, 116. A portion 117 of the rotatable operating rod assembly 7a may be composed of conducting material, so that there exists an electrical connection between the moving contacts of the main current units 120, more particularly illustrated in FIG. 15 of the drawings, and the impedance units 130, more particularly illustrated in FIG. 16 of the drawings.

Figure 15:
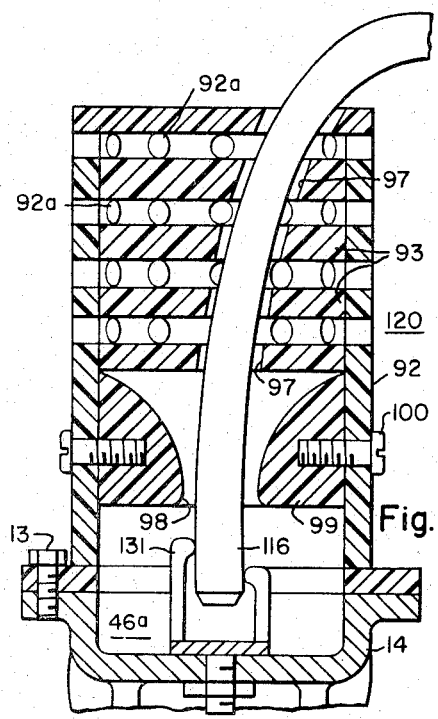
FIG. 15 is a sectional view taken through the main current-interrupting unit of the circuit-interrupting assemblage of FIGS. 12–14, the contact structure being illustrated in the closed-circuit position.
Figure 16:
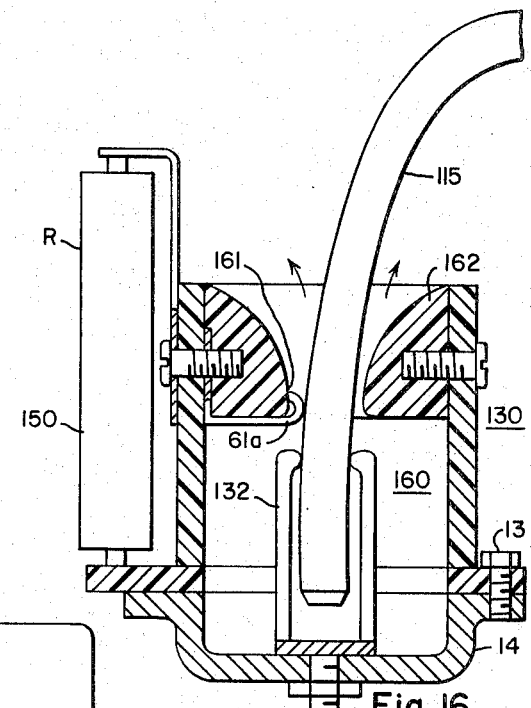
FIG. 16 is a sectional view taken through the impedance interrupting unit of the modified-type of circuit-interrupting assemblage of FIGS. 12–14, again the contact structure being illustrated in the closed-circuit position.
Figure 17:
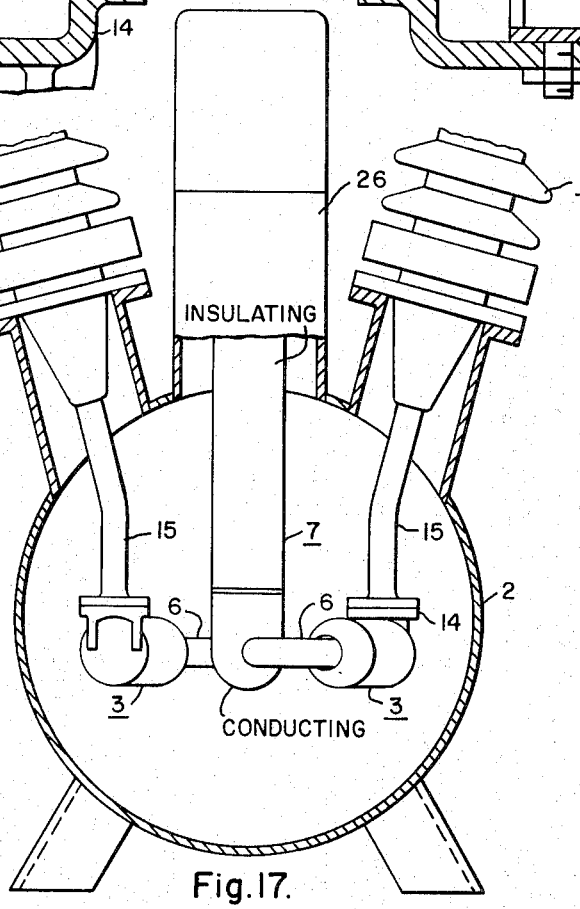
FIG. 17 illustrates a modified type of tank structure, which could be substituted for the tank structure of FIG. 1.

The relative lengths of the stationary contact structures 131, 132 is such, as more particularly illustrated in FIGS. 15 and 16 of the drawings, so as to maintain contact between the movable resistance contacts 115 and their associated relatively stationary contacts 132, while at the same time effecting separation between the movable contacts 116, from the stationary contacts 131 associated with the main-current interrupting units 120. The reason for this is that it is desired to effect extinction of the main-current arcs 140 (FIG. 12) prior to the extinction of the resistance-current arcs 141.

With reference to FIG. 15 of the drawings, it will be observed that the insulating extinguishing structure 120 is very similar to that previously described in connection with FIG. 11 of the drawings, with the exception that the resistor unit is omitted. Arc extinction occurs in a similar manner to that which has already been described in connection with FIG. 11 of the drawings. Consequently, it is believed that a reiteration of the description thereof is unnecessary. With regard to the resistance interrupting units 130, it will be noted that due to the greater overlap engagement between the contacts 115, 132, the resistance 150 is inserted into circuit upon retraction of each movable contact 115 from its associated stationary contact 132. Extinction of the residual-current arc is effected by a passage of compressed-gas out of the region 160 through the orifice opening 161 provided by an orifice member 162. The fully-open circuit position of the movable contact structure is illustrated by the dotted lines 6b of FIG. 14.

The circuit-interrupting structure of the present invention lends itself to a "building-block" type, or modular type of construction. The circuit-interrupting structure illustrated in FIG. 1 is, for example, suitable for say a voltage rating of 161 kv. with an interrupting rating of 15,000 mva., for example. For the higher voltages, a construction similar to that set forth in FIG. 18 may be employed with two tank structures 2 disposed in series. It will be noted that a supporting insulating bushing 180 is substituted for the second terminal bushing 17 of each tank structure 2.

It will be noted that the high-pressure gas may be stored at ground potential in the reservoirs 26 at the top of each pole-unit. Moreover, when the trip coil 30 is energized for the operating mechanism the solenoids 29, associated with the blast valves are simultaneously actuated so that high-pressure gas flows down inside of the hollow operating rods 7 and radially outwardly through the hollow contact arms 6 to fill the interrupting units 3 with high-pressure gas.

The gas, which is exhausted into the general interior of the tank structures 2, may be extracted, as say through the lead connections 24 by a suitable compressor means 25 and recompressed for replenishment to the high-pressure level necessary for storage in the high-pressure storage tanks 26.

If the blast valve 28 fails to open, it is mechanically opened when the contacts begin to move, assuring thereby gas flow in an interruption, but not necessarily three-cycle in operation. With the arrangement illustrated in FIG. 10, the source of compressed-gas is closer to the ends of the rotating movable contacts 6 than in the arrangement of FIG. 2, but, on the other hand, inspection of the blast valve 81 may be rendered more difficult.

It will be noted that the circuit breaker 1 is of the dead-tank type providing a disconnecting gap and allowing the use of conventional current transformers CT1, CT2. If desired, gas-filled terminal bushings 17 may be employed to permit the use of potential devices. The tank is preferably spherical in shape with minimum dimensions to live parts, assuring most economical gas requirements.

From available design data, a 32-inch diameter sphere 2 would be of sufficient volume, say having a volume of substantially 10 cubic feet. The interrupter preferably has smooth, well-rounded outer contours, providing excellent voltage-withstanding characteristics. The provision of isolating gaps in free space within the tank structures 2 prevents any organic insulation being stressed when the breaker is in the open-circuit position. In addition, the contact structure is in a vertical plane, preventing thereby accumulation of possible conducting powders. In the closed position, only the operating rod 7 is stressed. Long experience with oil circuit breakers has shown this to be a satisfactory arrangement. With the reservoir 26 at ground potential, leak-proof connections are rendered simple in construction. The gas may also be easily heated, which is a feature very desirable in cold climates. The gas reservoir 26 may be made as large as desirable to permit reclosing operations without regard to other design criteria.

Figure 18:
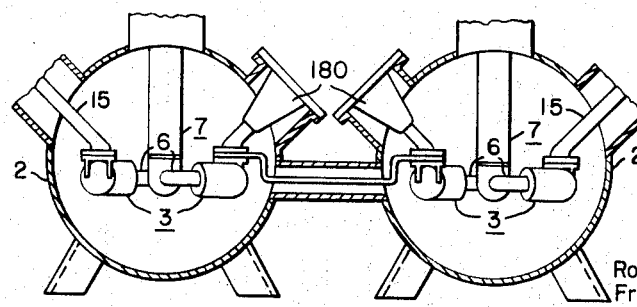
FIG. 18 illustrates a pair of serially-related tank structures, which could be employed for the higher voltage ratings.

High-ohmic resistors 60 may be used for voltage distribution since this circuit is broken in the open-circuit position. Much better voltage distribution may be obtained in this manner (in combination with capacitors) than may be obtained with capacitors alone. Additionally, contact inspection is very rapid, reducing outage time. The interrupter 1 lends itself to a "building-block" type of construction. For voltages above 161 kv., a second unit may be easily added, as shown in FIG. 18.

An important advantage of the present circuit-interrupter construction is that the design is extremely simple, and this consequently results in a very inexpensive breaker to construct.

From the foregoing description of the invention, it will be apparent that there is provided an improved gas-filled dead-tank breaker design of preferably the dual-pressure type with the high-presure reservoir 26 at ground potential, employing a minimum of organic insulations stressed in the open position, and with the interrupter units of the unique design which permit rapid inspection and maintenance and easy application of grading or low-ohmic resistors.

Although there has been illustrated and described specific structures, it is to be clearly understood that the same were merely for purpose of illustration, and that changes and modifications may readily be made therein by those skilled in the art, without departing from the spirit and scope of the invention.

We claim as our invention:

1. A compressed-gas dual-pressure circuit interrupter including a pair of gas-blast arc-extinguishing units, supporting means for supporting said pair of gas-blast arc-extinguishing units in spaced-apart relation, relatively stationary contact means associated with each of said gas-blast units, means defining a rotating conduit hub assembly, said rotating conduit hub assembly carrying a pair of serially-related movable tubular contacts for cooperating in a serial manner with the two relatively stationary contact means for establishing a pair of serially-related arcs, a source of high-pressure gas, means including said rotating conduit hub assembly for transmitting a flow of high-pressure gas from said high-pressure source radially outwardly through said pair of movable tubular contacts and toward the two serially-related established arcs to effect their extinction, and each arc-extinguishing unit including a confined chamber within which the outward expelled gas is stored for subsequent exhausting arc-extinguishing flow adjacent the respective arc.

2. A compressed-gas dual-pressure circuit interrupter including a metallic grounded tank assembly, a pair of spaced terminal bushings extending within said grounded tank assembly and carrying a pair of serially-related gas-blast arc-extinguishing units at their interior ends, relatively stationary contact means associated with each of said gas-blast units, means defining a rotating conduit hub assembly, said rotating conduit hub assembly carrying a pair of serially-related movable tubular contacts for cooperating in a serial manner with the two relatively stationary contact means for establishing a pair of serially-related arcs, a source of high-pressure gas, means including said rotating conduit hub assembly for transmitting a flow of high-pressure gas from said high-pressure source radially outwardly through said pair of movable tubular contacts and toward the two serially-related established arcs to effect their extinction, and each arc-extinguishing unit including a confined chamber within which the outward expelled gas is stored for subsequent exhausting arc-extinguishing flow adjacent the respective arc.

3. In combination, a metallic grounded tank assembly having a pair of terminal bushings extending therein, a high-pressure reservoir disposed between the pair of terminal bushings, a rotating conduit hub assembly extending downwardly within the tank assembly and terminating at its upper end interiorly of said high-pressure reservoir, blast-valve means associated with said hub assembly for controlling a blast of high-pressure gas through the rotating hub assembly, a pair of movable tubular contacts secured to and rotatable with the lower end of said conduit hub assembly, a pair of gas-blast arc-extinguishing units secured to the interior lower ends of said terminal bushings and having relatively stationary contact means associated therewith, each movable tubular contact separable from a relatively stationary contact means to draw an arc, and actuation of said blast-valve means being effective to cause a blast of high-pressure gas to flow radially outwardly through the pair of movable tubular contacts to effect extinction of the pair of serially established arcs, and each arc-extinguishing unit including a confined chamber within which the outward expelled gas is stored for subsequent exhausting arc-extinguishing flow adjacent the respective arc.

4. A gas-blast circuit interrupter having a pair of separable contacts cooperable to establish an arc, operating means for effecting opening and closing movement of said separable contacts, blast-valve means having an electrically-actuated means for effecting the opening operation thereof, the opening of said blast-valve means being effective to force a blast of gas toward said arc to effect the extinction thereof, and backup protective means including only a positive mechanical linkage connected to said operating means for positively effecting mechanical opening of said blast-valve means should there occur failure of said electrically-actuated means.

5. A circuit interrupter including a pair of spaced terminal bushings, an impedance-interrupting unit and a main-current interrupting unit at least partially supported by each of the two spaced terminal bushings, a rotating gas-conducting operating rod carrying two pairs of tubular gas-conducting movable contacts, gas-conducting means for feeding gas under pressure through said gas-conducting operating rod and into the four tubular gas-conducting movable contacts, relatively stationary contact means within each of the four units for separable engagement with the respective movable contact, series impedance means in the electrical circuit of each of the two impedance-interrupting units, means electrically connecting the two movable contacts of the main-current interrupting units together, means electrically connecting the two movable contacts of the impedance-interrupting units together, and means effecting arc establishment in the impedance-interrupting units at a later time than that in the main current interrupting units.

6. The combination according to claim 5, wherein a portion of the rotating operating rod is electrically conducting to connect the mid-points of the main current circuit and the impedance current circuit together.

7. In combination, separable contact means including a rotating tubular fluid-conducting contact operating rod, a relatively fixed blast-valve assembly disposed at least partially interiorly of one end of said operating rod, a blast valve, circuit means for electrically actuating said blast valve, and means rotating with the rotative contact operating rod to cam the blast valve to an open position in the event the circuit means fail to function.

8. A high-voltage circuit interrupter including a pair of spaced metallic grounded tanks having an inter-connecting conduit portion extending therebetween, a line-conducting terminal bushing extending into each tank, a supporting bushing extending into each tank, an interrupting unit supported by each bushing, a bridging conductor extending through said interconnecting conduit portion and serially electrically interconnecting a unit in each tank, a rotative gas-conducting operating rod bridging the units in each tank and carrying a pair of gas-conducting movable contacts to bridge the units in each tank, and means causing simultaneous rotative movement of the two operating gas-conducting rods.

9. A compressed-gas circuit interrupter including a substantially enclosed casing having an intermediate partition member defining a central orifice portion therein, a relatively stationary contact disposed adjacent one end of said casing on one side of said orifice portion, said end of the casing being closed, a movable tubular gas-conducting contact movable into said casing through said orifice portion and into contacting engagement with said relatively stationary contact at the closed end of the casing, means forcing a blast of gas through said movable contact in a direction toward said relatively stationary contact, a lateral vent opening in the wall of said casing on the other side of said orifice portion, whereby the outward expelled gas ejected from the movable tubular contact is stored in the closed confined end of the casing for subsequent exhausting arc-extinguishing flow through the orifice portion adjacent the arc.

10. The combination according to claim 9, wherein a finger contact is disposed at the other end of the casing, and a shunting impedance is electrically connected between the stationary contact and the finger contact for voltage control.

11. The combination according to claim 9, wherein spaced insulating splitter portions are interposed in the lateral vent opening for more effective arc interruption.

References Cited

UNITED STATES PATENTS

| | | | |
|---|---|---|---|
| 1,672,258 | 6/1928 | Hippenmeyer | 251—345 X |
| 1,674,914 | 6/1928 | Murray | 251—130 |
| 1,981,404 | 11/1934 | Whitney et al. | 200—150 |
| 2,586,290 | 2/1952 | Baker et al. | 200—148 |
| 2,459,612 | 1/1949 | Baker | 200—148 |
| 3,114,816 | 12/1963 | Beatty | 200—144 |

FOREIGN PATENTS

| | | |
|---|---|---|
| 432,264 | 7/1935 | Great Britain. |
| 721,386 | 6/1942 | Germany. |
| 310,618 | 1/1956 | Switzerland. |

ROBERT S. MACON, *Primary Examiner.*